United States Patent [19]

Dezawa

[11] 4,381,842
[45] May 3, 1983

[54] METAL ENCLOSURE AND MANUFACTURING METHOD THEREFOR

[75] Inventor: Syuichi Dezawa, Komae, Japan

[73] Assignee: Tokyo Shibaura Denki Kabushiki Kaisha, Kawasaki, Japan

[21] Appl. No.: 167,000

[22] Filed: Jul. 9, 1980

[30] Foreign Application Priority Data

Jul. 17, 1979 [JP] Japan .................................. 54-89819

[51] Int. Cl.³ ........................ B65D 6/38; B62K 31/02
[52] U.S. Cl. ....................................... 220/72; 220/62; 228/142
[58] Field of Search .................... 220/62, 72; 228/142, 228/173 C

[56] References Cited

U.S. PATENT DOCUMENTS

| | | | |
|---|---|---|---|
| 1,110,157 | 9/1914 | Stewart | 220/62 |
| 1,582,541 | 4/1926 | Ringer | 220/62 |
| 1,961,221 | 6/1934 | Hunter | 220/72 |
| 2,244,488 | 6/1941 | Darbyshire | 220/62 |
| 2,423,863 | 7/1947 | Wales | 220/62 |

FOREIGN PATENT DOCUMENTS 51-56935 5/1976 Japan.

*Primary Examiner*—George E. Lowrance
*Attorney, Agent, or Firm*—Oblon, Fisher, Spivak, McClelland & Maier

[57] ABSTRACT

In a metal enclosure having a left side wall, a top wall, a right side wall and a bottom wall, at least two adjacent walls among these four walls are formed by folding a single plate as a starting material along predetermined folding lines and closed U-shaped ribs extending substantially perpendicular to said folding lines are formed by folding said walls. Each of said ribs has two rib walls extending in the longitudinal direction of said rib and one of the two rib walls at said front end of each of the two ribs extending toward said folding line is formed longer than the other. One rib wall thus extending longer than the other of said two front ends are fitted together. The connection of said two ribs is accomplished by spot welding said fitted rib walls.

6 Claims, 6 Drawing Figures

METAL ENCLOSURE AND MANUFACTURING METHOD THEREFOR

The present invention relates to a metal enclosure having a left side wall, a right side wall, a top wall and a bottom wall.

Conventionally, it has been general practice to manufacture a metal enclosure, for example, a metal enclosure of a distributor, by combining shaped steels with notches formed at required places and welding the connecting portions. However, for reasons of economy, a panel type metal enclosure has been proposed according to which a metal enclosure is manufacturing from steel plates without using shaped steel. In this panel type metal enclosure, the left side wall, the right side wall, the top wall and the bottom wall are separately formed from flat plates whose edges are suitably bent for mutual connection (each wall is called a panel in this case). These panels are assembled by bolts rivets, or any other known means. In this type of the metal enclosure, columns made of shaped steels are spot welded inside the panels for reinforcement or for housing articles. The front side or the back side of the box body is so manufactured that a front door, a back door or a back panel may be attached as needed. This panel method has been defective in many respects since this method was fairly new in that a metal enclosure is manufactured from plates. The first defect is that as the metal enclosure is assembled with separately formed four walls, i.e., a left side wall, a right side wall, a top wall and a bottom wall, the assembly of the metal enclosure is time-consuming since the number of parts involved is great. Thus, many jigs or mounting tools are required for shortening the assembly time and improving the assembly precision. The second defect is that extra time is required for mounting columns inside the panels by spot welding or other methods. The third defect is that the enclosure may be easily deformed into a rhombic shape if a transverse force is exerted thereon when the panels are simply connected in the manner described above.

The primary object of the present invention is, therefor, to provide an improved panel type metal enclosure with sufficient strength and without the defects of the conventional panel type metal enclosure.

To attain this object the metal enclosure of the present invention comprises:

at least two adjacent walls among said four walls are formed by folding a single plate as a starting material along predetermined folding lines to form substantially a right angle, at least one closed U-shaped rib extends inwardly of said metal enclosure from each said wall, said rib being folded along predetermined rib extending base line, and lying substantially perpendicular to said folding lines, each said rib has two rib walls which are fixed to each other, ribs each formed to walls at both sides of said folding lines are fixed to each other at front ends, the front ends of said ribs are so formed that one of the two rib walls protrudes longer in the longitudinal direction of the rib than the other and the protruded part of one rib wall of one rib can be fitted with the protruded part of one rib wall of its paired rib, and the fixing of the front ends of said ribs is accomplished by fixing said protruded and fitted rib walls.

And a method for manufacturing a metal enclosure which has a left side wall, a top wall, a right side wall, and a bottom wall, wherein at least two adjacent walls among these four walls are formed by folding a single plate as a starting material along predetermined folding lines characterized by comprising:

a first step of forming holes for forming connecting portions on said folding lines of said starting material;

a second step of forming closed U-shaped ribs which cross said holes for connecting portions and which stand upright from said starting material along rib forming lines defined substantially perpendicular to said folding lines, each said rib having two rib walls extending in the longitudinal direction of said ribs, and one of the rib walls extending longer than the other in the longitudinal direction of said rib due to the formation of said hole for forming the connecting part;

a third step of folding said starting material along said folding lines so as to form a substantially right angle, the ribs formed at both sides of said folding lines being arranged to oppose each other substantially at right angles and rib walls protruding longer from front ends of both ribs being fitted together; and a fourth step of fixing said two fitted rib walls.

With the metal enclosure in accordance with the present invention a plurality of walls are formed from a single plate by folding the plate, and reinforcing ribs for each wall and connecting portions of the ribs are worked previously upon the single plate by folding the plate and making holes in the plate respectively.

This invention can be more fully understood from the following detailed description when taken in conjunction with the accompanying drawings, in which.

Figure 1:
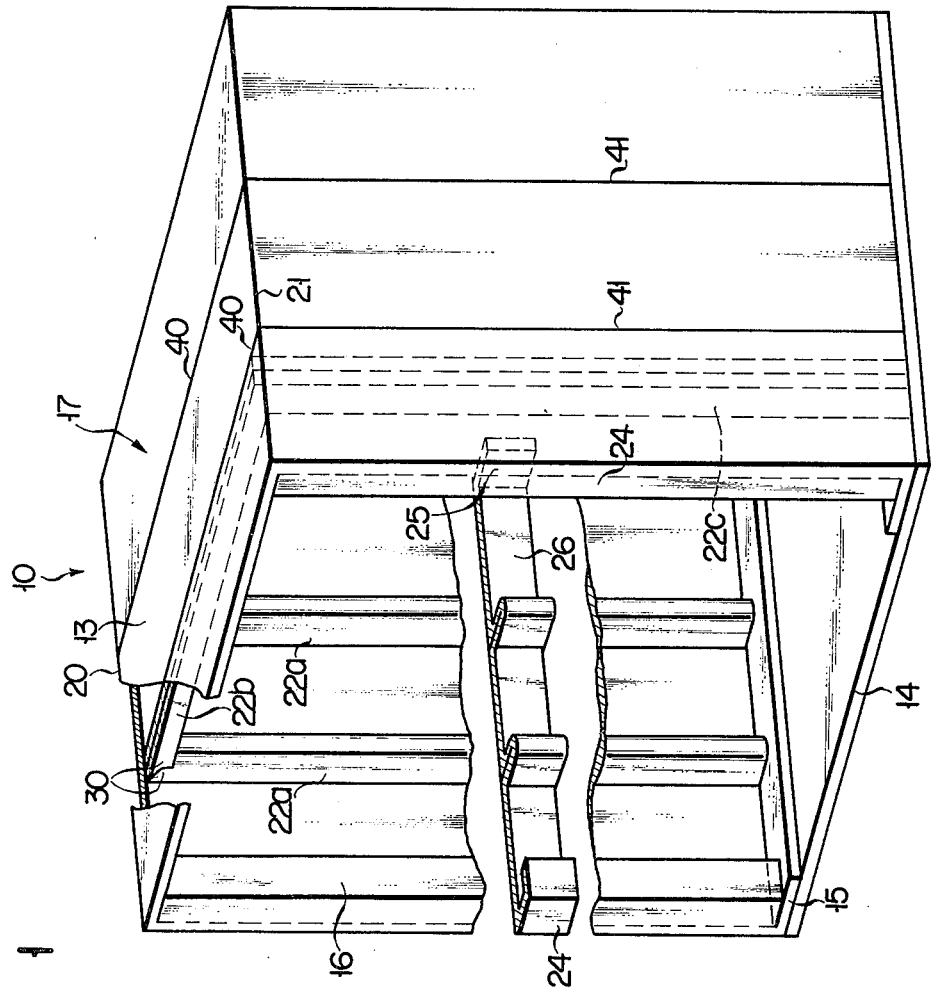
FIG. 1 is a partially sectional perspective view of a metal enclosure of the present invention.
Figure 2:
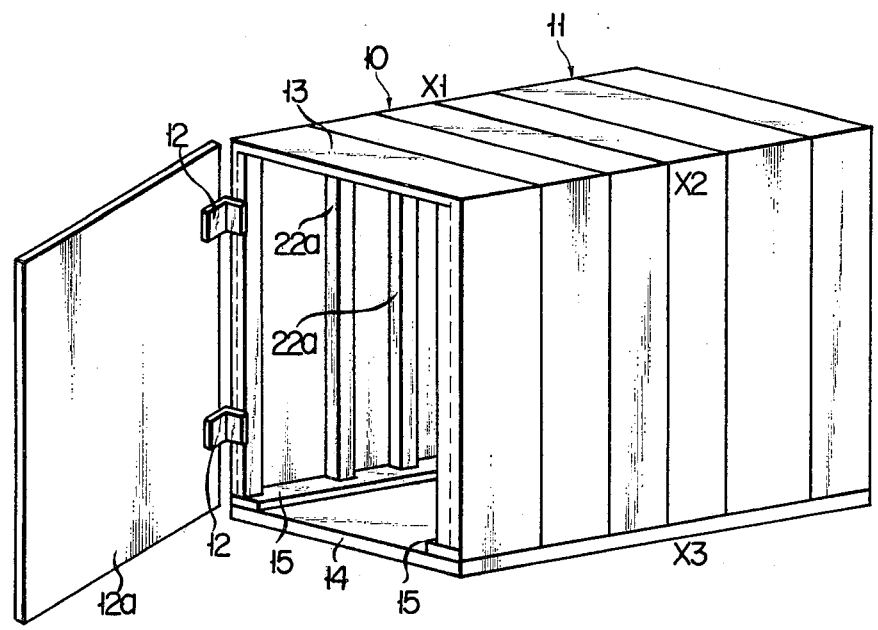
FIG. 2 is a perspective view illustrating the manner in which the metal enclosure of FIG. 1 are connected and a front door is attached.

FIG. 1 shows a metal enclosure 10 in accordance with the present invention. The metal enclosure of the present invention may be connected with other metal enclosure to form a large composite metal enclosures. FIG. 2 shows the case wherein metal enclosure 10 and 11 of the same shape are connected with their backs facing each other. Line $X_1$-$X_2$-$X_3$ represents the boundary between these two metal enclosures. A front door or a back door may be attached to the front or back of the metal bodies shown in FIGS. 1 and 2. The composite metal enclosure shown in FIG. 2 illustrates a case wherein a front door 12a is attached to the metal enclosure through hinges 12 mounted at the front end of the metal enclosure.

The metal enclosure 10 has a U-shaped or channel-shaped member 13 formed by folding a plate to be used as a starting material (to be described later), that is, a main plate, and a bottom wall 14 attached to its lower end. Bottom wall mounting parts 15 are formed extending toward each other at the lower end of the channel-shaped member 13. The bottom wall 14 is attached to the mounting parts 15 by a suitable method such as spot welding. The channel shaped member 13 has a left side wall 16, a top wall 17 and a right side wall 18. Numeral 20 in the figure denotes a folding line between the left side wall 16 and the top wall 17; and 21 denotes a folding line between the top wall 17 and the right side wall 18. Ribs 22a, 22b and 22c, connected in a U-shape, are formed on the walls 16, 17 and 18, respectively, perpendicularly to the folding lines 20 and 21. Channel-shaped parts 24 are formed at the front ends of the side walls 16 and 18, and L-shaped parts 25 are formed at their back ends. Numeral 26 in FIG. 1 denotes a piece of the left side wall 16 as horizontally cut. The shapes of the channel-shaped part 24, the rib 22a and the L-shaped part 25 may be seen from this piece 26. The ribs 22b and 22c have the same cross section as the rib 22a. The channel-shaped part 24, as shown in FIG. 2, is used for fixing the hinges for mounting the front door 12a and the L-shaped part 25 is used for connecting the metal enclosures 10 and 11 as shown in FIG. 2. In FIG. 1, the top wall 17 is shown partially removed, and the ribs 22a and 22b are substantially perpendicularly connected at the corner where the top wall 17 and the left side wall 16 meet. The connecting portion of the ribs 22a and 22b, that is, a front end 30, will be described.

Figure 3:
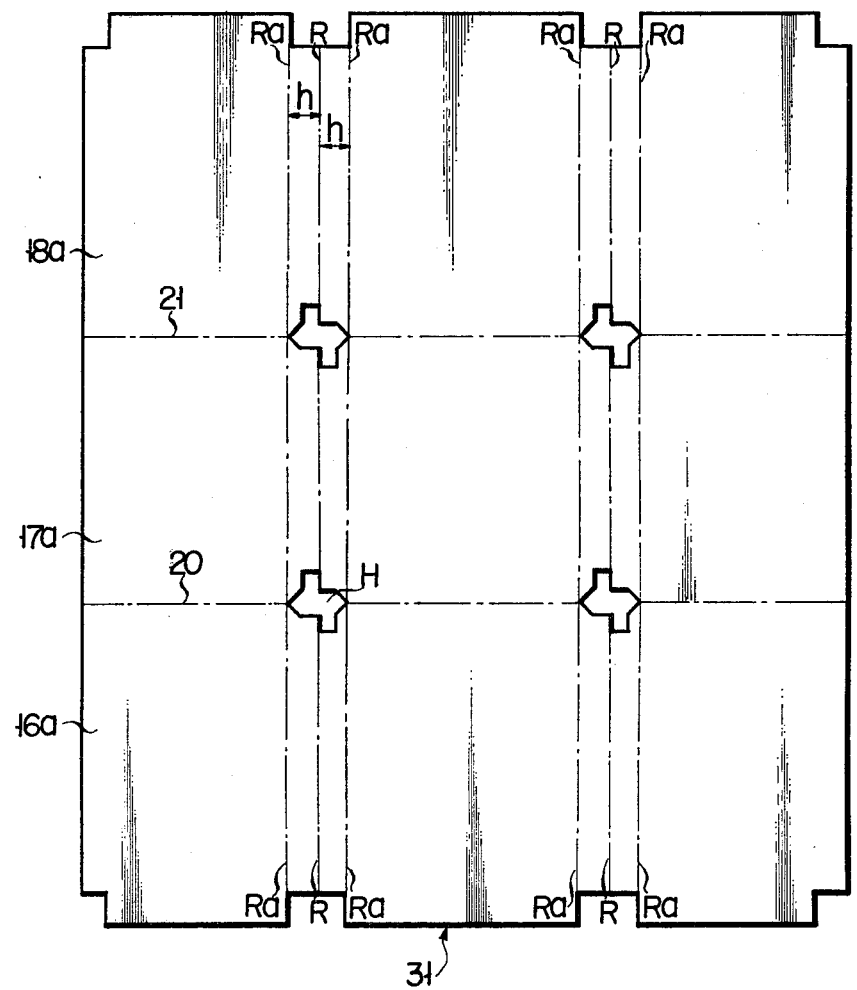
FIG. 3 is a front view of a single plate as a starting material for forming a channel-shaped member of the metal enclosure of FIG. 1.

FIG. 3 shows a main plate 31 for forming the channel-shaped member 13 by folding. The lines 20 and 21 drawn on the starting material 31 are folding lines shown in FIG. 1. A first plate part 16a below the line 20, a second plate part 17a between the lines 20 and 21, and a third plate part 18a above the line 21 in FIG. 3 are parts for forming the left side wall 16, the top wall 17 and the right side wall 18, respectively. Two lines R—R drawn on the main plate 31 are for showing where the ribs 22a, 22b and 22c are to be formed. Holes H formed at the intersection of the folding lines 20 and 21 with the R—R lines are used for forming the connecting portions or front ends 30 for the ribs 22a, 22b and 22c.

Figure 4:
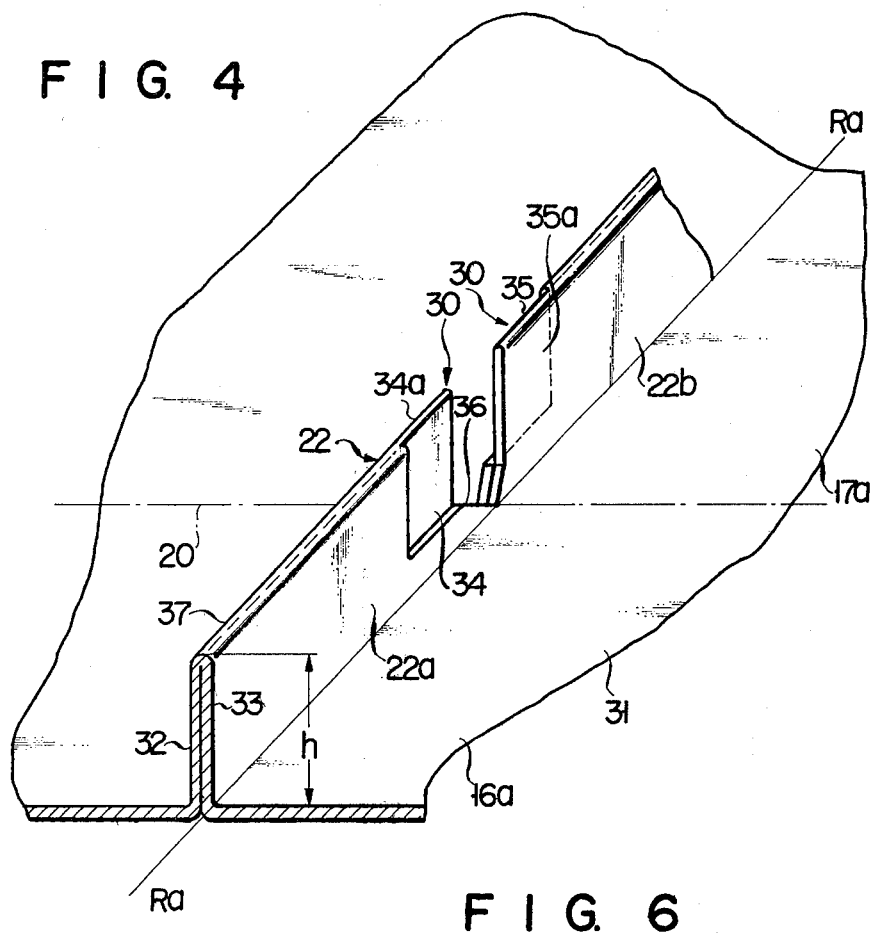
FIG. 4 is a schematic perspective view of a closed U-shaped rib formed by folding the plate shown in FIG. 3.

For forming the channel-shaped member 13, ribs 22 are formed along the R—R lines of the main plate 31. Each of the ribs 22 is formed by folding the main plate 31 along the line R—R, that is, the rib forming line, toward foreground of FIG. 3 and attaching the inclined portions formed at both sides. This rib is called a closed U-shaped rib. The rib is divided into three parts by the holes H. The parts of the rib at the first, second and third plate parts 16a, 17a and 18a are denoted 22a, 22b and 22c, respectively. The shapes of the ribs 22a and 22b and the first and second plate parts 16a and 17a are shown in FIG. 4. However, since the other part of the rib 22 is apparent from the description made with reference to FIG. 4, it is not shown in the figure. This type of rib is easily manufactured by a machine tool called a roll former or a roll forming machine. Lines Ra—Ra, equidistantly spaced by the distance h from the lines R—R at both sides, are lines from which the ribs 22 stand substantially perpendicularly upright from the starting material 31. As may be seen from FIG. 4, the ribs 22, that is the ribs 22a and 22b (the rib 22c is omitted) have closely contacted rib walls 32 and 33. The height of a top part 37 folded through 180 degrees with respect to the main plate 31 is the same as the distance h. When the rib 22 is viewed from the outside of the metal enclosure, the boundary between the rib walls 32 and 33 can be seen.

Figure 5:
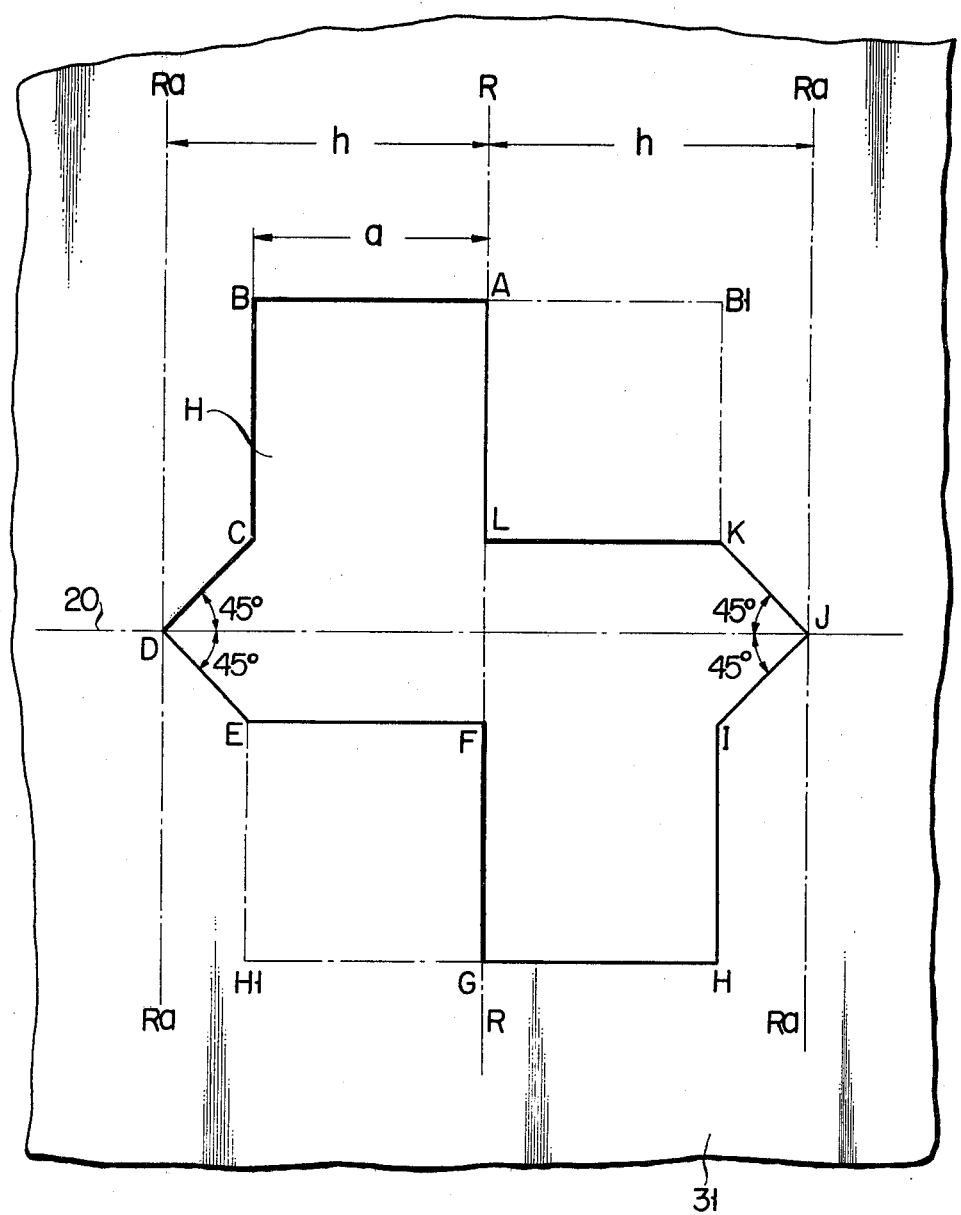
FIG. 5 is an enlarged front view of a hole for forming a connecting portion in the plate shown in FIG. 3.

The shape and the forming method of the connecting portions 30 (FIG. 1) of the ribs 22a, 22b and 22c will be described taking the connecting portion 30 between the ribs 22a and 22b as an example. FIG. 5 is an enlarged view of the hole H for forming a connecting part. The shape of this hole H will be described with reference to the symbols A through L around the hole H. Tetragons defined by the symbols ABCL and FGHI are squares with sides of length a, and the segments defined by the symbols CD, DE, IJ, and JK form angles of 45 degrees with respect to the folding line 20. The distance between each of the points D and J and the R—R line is substantially equal to the height h of the rib 22. The shape of the part between the ribs 22a and 22b with the hole H is shown in FIG. 4.

A space 34 formed in the rib wall 33 of FIG. 4 corresponds to the hole defined by the symbols FGHI of FIG. 5, and a projection 34a of the rib wall 32 extending parallel to the hole 34 corresponds to the square defined by the symbols EFGH$_1$ of the main plate 31 as shown in FIG. 5. A space 35 formed in the rib wall 32 of FIG. 4 corresponds to the hole defined by the symbols ABCL of FIG. 5, and a projection 35a of the rib wall 33 extending parallel thereto corresponds to the square defined by the symbols AB$_1$KL of the main plate 31 as shown in FIG. 5. A V-shaped part 36 of FIG. 4 is formed by fitting together the edges CDE and IJK of FIG. 5. Thus, the symbols GHIJ and FED are lines for notching the rib walls 33 and 32 for forming the front end 30 of the rib 22a, and the symbols ABCD and LKJ are lines for notching the rib walls 32 and 33 for forming the front end 30 of the rib 22b.

Figure 6:
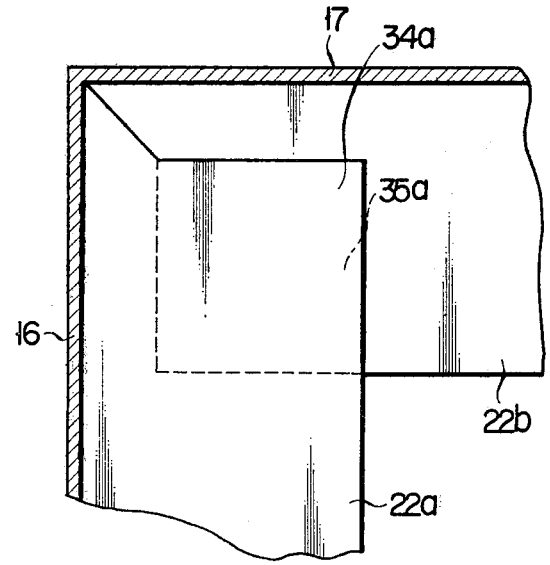
FIG. 6 is a front view illustrating the connected state of the connecting portion of the two ribs.

After forming two ribs by repeating the above process, the member shown in FIG. 4 is folded through about 90 degrees along the folding line 20. The direction to fold it is such that the projection 34a of the rib wall 32 and the projection 35a of the rib wall 33 fit with each other. The fitted projections 34a and 35a are securely fixed by means such as spot welding. Then the left side wall 16 and the top wall 17 are securely connected at the front end, that is, the connecting portion 30. This is shown in FIGS. 1 and 6. Lines 40 and 41 on the outer surfaces of the top wall 17 and the right side wall 18 of the metal enclosure 10 shown in FIG. 1 represent boundaries between the rib walls which may be seen when the ribs 22b and 22c are viewed from outside. The formation of through-holes at the above-mentioned part or at another portion of the rib is often advantageous for housing articles within the metal enclosure 10 after completion of its assembly. Such a through-hole may be formed in a similar manner as in the case of the hole H when the metal enclosure 10 is still in the condition of the single plate shown in FIG. 3. Positions of such through-holes are so selected that after assembly of the metal enclosure 10, holes are positioned at various desired places of the ribs or walls.

The above description has been made with reference to a metal enclosure, in which the left side wall 16, the top wall 17, and the right side wall 18 are formed from a single main plate 31. However, the present invention is not limited to this construction wherein the three walls are formed from a single plate, but two adjacent walls among the left side wall 16, the top wall 17, the right side wall 18 and the bottom wall 14 may be formed from a single plate in a manner similar to that described above.

In the metal enclosure of the present invention as described above, at least two walls are formed from a single plate so that members for connecting the walls or parts of the walls fitted together for connecting the walls are not required. Further, since the reinforcing ribs are formed by folding the plate material, extra reinforcing members need not be manufactured and attached. Thus, the present invention is advantageous in that the number of parts, the weight, and the number of manufacturing steps are reduced. Further, the metal enclosure is strong and will not easily deform into a rhombic shape when a transverse force is exerted on it because reinforcing ribs are formed, and the connecting parts show the same effects as the case where a gusset plate is used for connecting the ribs at the corners of the metal enclosure, regardless of the fact that the metal enclosure is manufactured from a plate material.

Further, in the method for manufacturing a metal enclosure in accordance with the present invention as described above, the manufacture of a strong metal enclosure is possible with a smaller number of manufacturing steps and required parts. The method of the present invention is suitable for mass production of metal enclosure.

What is claimed as new and desired to be secured by Letters Patent of the United States is:

1. A metal enclosure having a left side wall, a top wall, a right side wall, and a bottom wall wherein:
at least two adjacent walls among said four walls are formed by folding a single plate as a starting material along predetermined folding lines to form substantially a right angle,
at least one closed U-shaped rib extends inwardly of said metal enclosure from each said wall, said rib being folded along a predetermined rib extending base line, and lying substantially perpendicular to said folding line,
each said rib has two rib walls which are fixed to each other,
ribs each formed to walls at both sides of said folding lines are fixed to each other at front ends thereof,
said front ends of said ribs are so formed that the front end of one of the two rib walls is cut away so that the front end of the other of said two walls protrudes longer in the longitudinal direction of the rib than the the front end of said one of said walls, and the protruded part of said other rib wall of each rib can be fitted with the protruded part of said other rib wall of its paired rib opposite said folding line, and
the fixing of the front ends of said ribs is accomplished by fixing said protruded and fitted rib walls.

2. A metal enclosure as claimed in claim 1 wherein the front end of each said rib is formed in such a manner that one of two rib walls is notched by a line extending by a first predetermined length at an angle of 45 degrees with respect to the longitudinal direction of said rib from intersections of said rib extending base lines and said folding lines, said line further extending by a second predetermined length in the longitudinal direction of said rib and thereafter extending to the top of said rib by the second predetermined length in a direction perpendicular to the longitudinal direction of said rib; the other one of said rib walls is notched by a line extending by said first predetermined length at an angle of 45 degrees with respect to the longitudinal direction of said rib from said intersections of said rib extending base lines and said folding lines, said line further extending to the top of said rib by said second predetermined length in a direction substantially perpendicular to the longitudinal direction of said rib.

3. The enclosure of claim 1 wherein each said rib wall extends in a plane and wherein each said fitted protruding wall is in the same plane as the remainder of the respective rib wall thereof.

4. A method for manufacturing a metal enclosure which has a left side wall, a top wall, a right side wall, a bottom wall, wherein at least two adjacent walls among these four walls are formed by folding a single plate as a starting material along predetermined folding lines comprising:
a first step of forming holes for forming connecting portions on said folding lines of said starting material;
a second step of forming closed U-shaped ribs which cross said holes for forming connecting portions and which stand upright from said starting material along rib forming lines defined substantially perpendicular to said folding lines, each said rib having two rib walls extending in the longitudinal direction of said ribs, and each of the rib walls having a front end extending longer than the other of said rib walls in the longitudinal direction of said rib due to the formation of said hole for forming the connecting part;
a third step of folding said starting material along said folding lines so as to form a substantially right angle, the ribs formed at both sides of said folding lines being arranged to oppose each other substantially at right angles and said front ends of said rib walls on opposite sides of said folding lines being overlappingly fitted together; and
a fourth step of fixing said two fitted rib walls, wherein said rib walls are not bent.

5. A method as claimed in claim 4 wherein the fixing of said two rib walls is accomplished by spot welding.

6. The method of claim 4 wherein said protruding walls of said ribs are not bent out of the planes of said ribs during said fitting step.

* * * * *